United States Patent [19]

Lim et al.

[11] 4,128,312
[45] Dec. 5, 1978

[54] LONG LIFE REFLECTIVE LIQUID CRYSTAL DISPLAY FOR DC OPERATION

[75] Inventors: Hong S. Lim, Agoura; Michael J. Little, Tarzana, both of Calif.

[73] Assignee: Hughes Aircraft Company, Culver City, Calif.

[21] Appl. No.: 839,224

[22] Filed: Oct. 4, 1977

[51] Int. Cl.$^2$ ............................ G02F 1/13; C09K 3/34
[52] U.S. Cl. ..................................... 350/336; 252/299; 252/408; 350/338; 350/350
[58] Field of Search ....................... 350/336, 338, 350; 252/299, 408

[56] References Cited

U.S. PATENT DOCUMENTS

| | | | |
|---|---|---|---|
| 3,814,501 | 6/1974 | Schindler | 350/338 |
| 3,814,700 | 6/1974 | Aviram et al. | 252/408 |
| 3,876,286 | 4/1975 | Deutscher et al. | 252/299 |
| 3,932,024 | 1/1976 | Yaguchi et al. | 350/338 |
| 3,932,298 | 1/1976 | Labes | 252/299 |
| 3,975,285 | 8/1976 | Ohnishi et al. | 252/299 |
| 3,990,984 | 11/1976 | Barret et al. | 252/299 |
| 4,002,670 | 1/1977 | Steinstrasser | 252/299 |
| 4,005,928 | 2/1977 | Kmetz et al. | 252/299 |
| 4,066,569 | 1/1978 | Lim | 252/299 |

Primary Examiner—Benjamin R. Padgett
Assistant Examiner—T. S. Gron
Attorney, Agent, or Firm—B. T. Hogan, Jr.; W. H. MacAllister

[57] ABSTRACT

Reflective mode dynamic scattering displays are disclosed which operate under dc excitation for extremely long hours with excellent contrast. These displays are the results of a combination of a high reflectivity cathode, obtained by the use of silver mirror electrodes, with a redox doped ester liquid crystal in an otherwise conventional liquid crystal cell arrangement.

9 Claims, 2 Drawing Figures

LONG LIFE REFLECTIVE LIQUID CRYSTAL DISPLAY FOR DC OPERATION

BACKGROUND OF THE INVENTION

1. Field of the Invention

This invention is related to the preparation of dynamic scattering liquid crystal display devices in general and more particularly to the preparation of reflective mode dynamic scattering liquid crystal display devices which operate under dc excitation.

2. Prior Art

A good dynamic scattering liquid crystal display device requires high contrast ratio and long operational life. For a reflective display, high reflectivity of a mirror-like surface and good scattering of liquid crystal are needed for high contrast ratios. Reflection mode, as opposed to transmission mode, dynamic scattering liquid crystal (LC) displays take maximum advantage of the ambient light to produce contrast.

Prior to this invention, reflective mode dynamic scattering displays were practically restricted to ac operations for two reasons: (1) the liquid crystal and/or the liquid crystal dopants were not stable under dc excitation and (2) many of the high reflectivity metals are either not stable themselves or cause the rapid degradation of an otherwise stable dc liquid crystal dopant system.

DC operation is a desirable characteristic because it reduces the complexity of the associated addressing circuitry, especially in the case of integrated circuits. High reflectivity electrodes have been known to be desirable for some time.

Aluminum, which is usually coated with a thin transparent coating of silicon dioxide has been used in the manufacture of liquid crystal displays that were strictly restricted to ac operation. A high contrast reflective type dynamic scattering display with long life under dc operations, however, was not previously available.

It is therefore an objective of this invention to provide a display device which exhibits high contrast ratio for long operating periods.

A second objective of this invention is to provide a reflective mode dynamic scattering liquid crystal display device.

A third, and still further, objective of this invention is to provide a dynamic scattering liquid crystal display device that exhibits long operational life under dc mode excitation.

Applicants know of no prior art which meet all of their above stated objectives.

RELATED APPLICATIONS

U.S. application Ser. No. 645,155, filed Dec. 30, 1975, by Applicant Hong Sup Lim herein, now issued as U.S. Pat. No. 4,066,569, is directed to a novel liquid redox doped liquid crystal. The materials of this related application are used in the cells disclosed in the present invention.

SUMMARY OF THE INVENTION

A dynamic scattering liquid crystal display device exhibiting a high contrast ratio and a long operational life under dc mode excitation has been invented. This display device is the result of the combination of a long life redox doped phenyl benzoate ester liquid crystal mixture and a high reflectivity silver mirror electrode. The invention has shown a high contrast ratio for well over 15,000 hours at 20 volts dc excitation.

DETAILED DESCRIPTION OF THE INVENTION

In U.S. application Ser. No. 645,155, filed Dec. 30, 1975, by co-applicant Hong Sup Lim herein, now issued as U.S. Pat. No. 4,066,569, liquid crystal mixtures doped with redox dopants were disclosed as suitable for dc dynamic scattering mode operations. The teachings of U.S. Pat. No. 4,066,569 relating to the preparation of the LC mixtures are incorporated herein by reference.

Attempts to utilize the doped LC mixtures of U.S. Pat. No. 4,066,569 to provide a dc DSM reflective mode light display device utilizing conventional reflective mode electrodes, such as aluminum or platinum, for fabricating the LC cell were unsuccessful because of the reactivity of conventional reflective mode electrodes to LC mixtures which exhibit dc DSM characteristics.

LC mixtures capable of dc operations such as those shown in Table I when doped with a redox dopant comprised of dibutylferrocene (dibuFc) and (2,4,7,-trinitro-9-fluorenylidene)-malononitrile (TFM) tend to undergo chemical reaction in the presence of conventional reflective metal electrodes such as aluminum.

TABLE I

Dynamic Scattering Mode Liquid Crystal Mixtures

| Mixture Code No. | Components | | Weight % |
|---|---|---|---|
| 2N10 | p-butylphenyl | p-toluate | 39.5 |
| | p-butoxyphenyl | p-butoxybenzoate | 13.2 |
| | p-butoxyphenyl | p-hexyloxybenzoate | 23.7 |
| | p-butoxyphenyl | p-octyloxybenzoate | 23.7 |
| 2N12 | p-butylphenyl | p-toluate | 36.6 |
| | p-butoxyphenyl | p-butoxybenzoate | 11.7 |
| | p-butoxyphenyl | p-hexyloxybenzoate | 12.6 |
| | p-butoxyphenyl | p-octyloxybenzoate | 13.6 |
| | p-butoxyphenyl | p-valeryloxybenzoate | 25.2 |
| 2N14 | p-hexyloxyphenyl | p-methoxybenzoate | 28.4 |
| | p-hexyloxyphenyl | p-butylbenzoate | 25.2 |
| | p-octyloxyphenyl | p-hexyloxybenzoate | 46.4 |
| 2N40 | p-methoxyphenyl | p-toluate | 4.8 |
| | p-ethoxyphenyl | p-propylbenzoate | 11.5 |
| | p-ethoxyphenyl | p-pentylbenzoate | 15.1 |
| | p-butoxyphenyl | p-toluate | 9.1 |
| | p-butoxyphenyl | p-hexylbenzoate | 34.2 |
| | p-hexyloxphenyl | p-methoxybenzoate | 25.3 |

Figure 1:
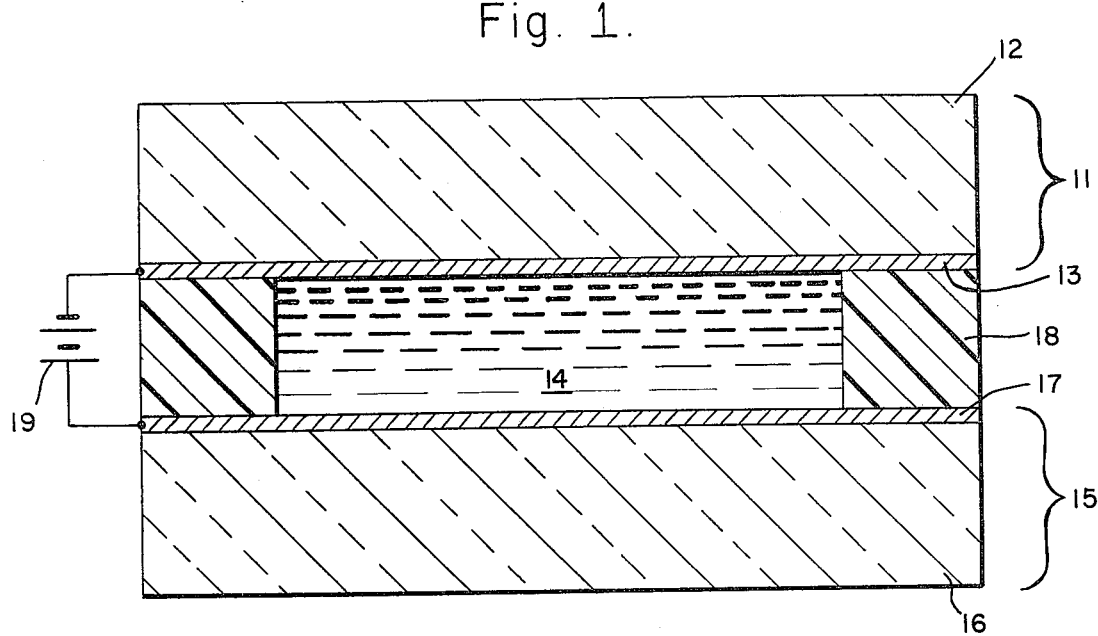
FIG. 1 is a schematic drawing of the liquid crystal display cell.

We have discovered that excellent reflective mode LC dc DSM cells can be prepared in accordance with the schematic shown in FIG. 1 where the reflective electrode 11 is fabricated from a glass or other flat, rigid substrate 12 coated with a layer of silver 13. Other substrates which meet rigidity and flatness requirements, such as copper or silicon wafers, that are receptive to silver coating may be used.

The silver coating may be evaporated or sputtered directly onto the substrate, or it may be evaporated or sputtered onto an intermediate coating having been previously applied to the substrate to form a silver receptive surface. Silver surface layers of approximately 1000 angstroms have been shown to be adequate.

The reflective mode display device is completed by placing the doped LC mixture 14 between the reflective electrode 11 and a transparent electrode 15 formed by coating a transparent substrate 16 with a thin layer of indium-tin oxide (ITO), indium oxide, tin oxide or other similar material 17 maintained in a predetermined spaced relationship with respect to the reflective electrode by spacers 18.

The spacers 18 may be fabricated from mylar or other materials that are chemically inert with respect to the doped LC mixture and the metallic surface of the electrodes.

Generally, spacers are not required to retain the liquid crystal mixture because of the surface tension characteristics of the mixtures. However, an auxillary benefit of spacers fabricated from solid material is the retention of the doped LC mixture in contact within the area of the cell bounded by the electrodes.

The later characteristic is required in order for the LC mixture 14 to function as an active electro-optic element in response to electrical signals applied through leads 19 connected to a battery or other power source.

In operation, the clear LC layer, in an off state, becomes turbid (dynamic scattering effect) upon application of an electrical signal greater than a certain threshold value. Operational characteristics, such as threshold voltage requirements and response times, are dependent upon the thickness of the LC layer separating the two electrodes as well as the composition of the LC mixture and the amount of dopant employed. U.S. Pat. No. 4,066,569 contains teachings which enable others to prepare doped LC mixtures useful in this invention. Specific dopant mixture compositions may be adjusted as required to optimize the desired LC mixture response characteristics.

As an example, an LC display device prepared from a silver mirror electrode, formed by evaporating silver onto a glass substrate, and a 2N10 LC mixture doped with 0.05% by weight of dibuFc and 0.05% by weight of TFM in combination with an ITO coated electrode has operated for more than 15,000 hours with relatively stable current levels.

Figure 2:
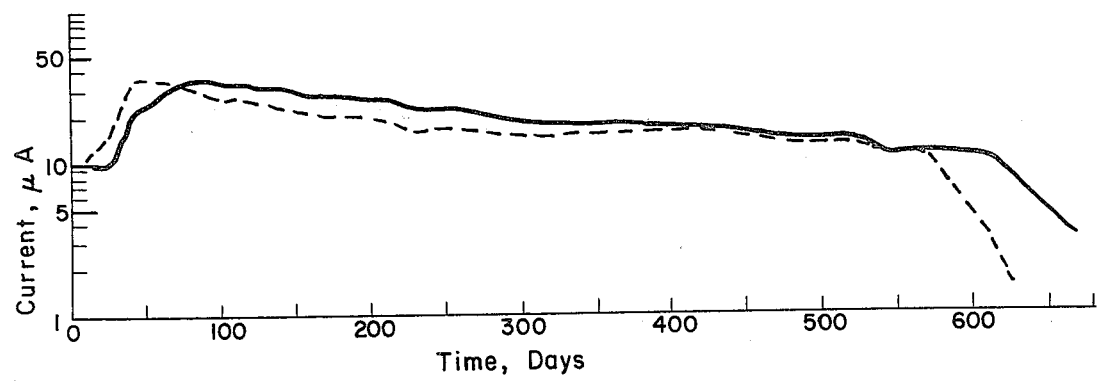
FIG. 2 is a plot of current levels for a continuous operation of the dc dynamic scattering (DSM) cell in dry nitrogen atmosphere under a 20 volt dc excitation as a function of time.

FIG. 2 is a plot of current versus time for an LC dispaly cell having a one square inch electrode area per ½ mil of cell thickness operated at 20 Vdc in a dry nitrogen atmosphere. It can be seen from this plot which presents current levels for continuous operation of two dynamic scattering cells, having 1.0 square inch of electrode area, in a dry $N_2$ atmosphere at 20 Vdc, that the current level is stable for almost two years of continuous dc operation. We know of no prior art dc operated liquid crystal display cell that is capable of surviving more than a few months under similar operating characteristics and still exhibit contrast ratios comparable to that exhibited by this invention (>10 when the current level was higher than 2 $\mu a$.).

Having fully disclosed our invention and provided teachings which enable others skilled in the art to make and use our invention, the scope of our claims may now be understood as follows:

What is claimed is:

1. A reflective mode dynamic scattering display device capable of sustained operation when subjected to a dc current excitation comprising an electrode consisting of a transparent substrate coated with a thin layer of transparent conductor film selected from the group consisting of indium oxide, tin oxide and indium-tin oxide which functions as an anode, and a rigid substrate containing a silver mirror surface which surface functions as a cathode, maintained in a predetermined spaced relationship to said anode by spacers, the intermediate space containing a phenylbenzoate ester liquid crystal mixture doped with a redox dopant formed from mixtures of metallocenes and conjugated cyano-organic compounds which functions as an active electro-optic element in response to a dc current excitation.

2. The display device of claim 1 wherein said redox dopant is comprised of dibutylferrocene and 2,4,7,-trinitro-9-fluorenylidene)-malononitrile.

3. The display device of claim 2 wherein said phenylbenzoate ester liquid mixture is selected from the group consisting of 2N10, 2N12, 2N14 and 2N40 liquid crystal mixtures.

4. The display device of claim 2 wherein said liquid crystal mixture is comprised of 39.5% p-butylphenyl p-toluate, 13.2% p-butoxybenzoate, 23.7% p-butoxyphenyl p-hexyloxybenzoate and 23.7 p-butoxyphenyl p-octyloxybenzoate.

5. The claims of the display device of claim 2 wherein said phenylbenzoate mixture is comprised of 28.4% p-hexyloxyphenyl p-methoxybenzoate, 25.0% p-hexyloxyphenyl p-butoxybenzoate and 46.4% p-octyloxyphenyl p-hexyloxybenzoate.

6. A liquid crystal display device capable of sustained reflective mode dynamic scattering operations when subjected to a dc current excitation comprising a silver mirror cathode separated from a transparent anode comprising a thin layer of conductive film deposited on a transparent substrate by a phenylbenzoate liquid crystal mixture doped with a redox dopant formed from a mixture of metallocenes and conjugated cyano-organic compounds.

7. The display device of claim 6 wherein said liquid crystal mixture is a 2N10 mixture and said dopant comprises dibutylferrocene and (2,4,7,-trinitro-9-fluorenylidene)-malononitrile.

8. The display device of claim 6 wherein said conductive film is selected from the group consisting of indium oxide, indium-tin oxide and tin oxide.

9. A reflective mode dynamic scattering display device comprising a silver mirror cathode maintained in a predetermined spaced relationship to an anode comprised of a transparent substrate coated with a thin layer of transparent conductor film selected from the group consisting of indium oxide, tin oxide and indium-tin oxide by a phenylbenzoate ester liquid crystal mixture, doped with a redox dopant, formed from a mixture of metallocenes and conjugated cyano-organic compounds, which doped liquid crystal mixture functions as an active electro-optic element in response to dc current excitation, and spacers, for said electrodes, said display device being capable of sustained operation when subjected to said dc current excitation.

* * * * *